April 11, 1933. A. L. LANGE 1,903,717
HEAT CONSUMPTION METER
Filed Aug. 12, 1925
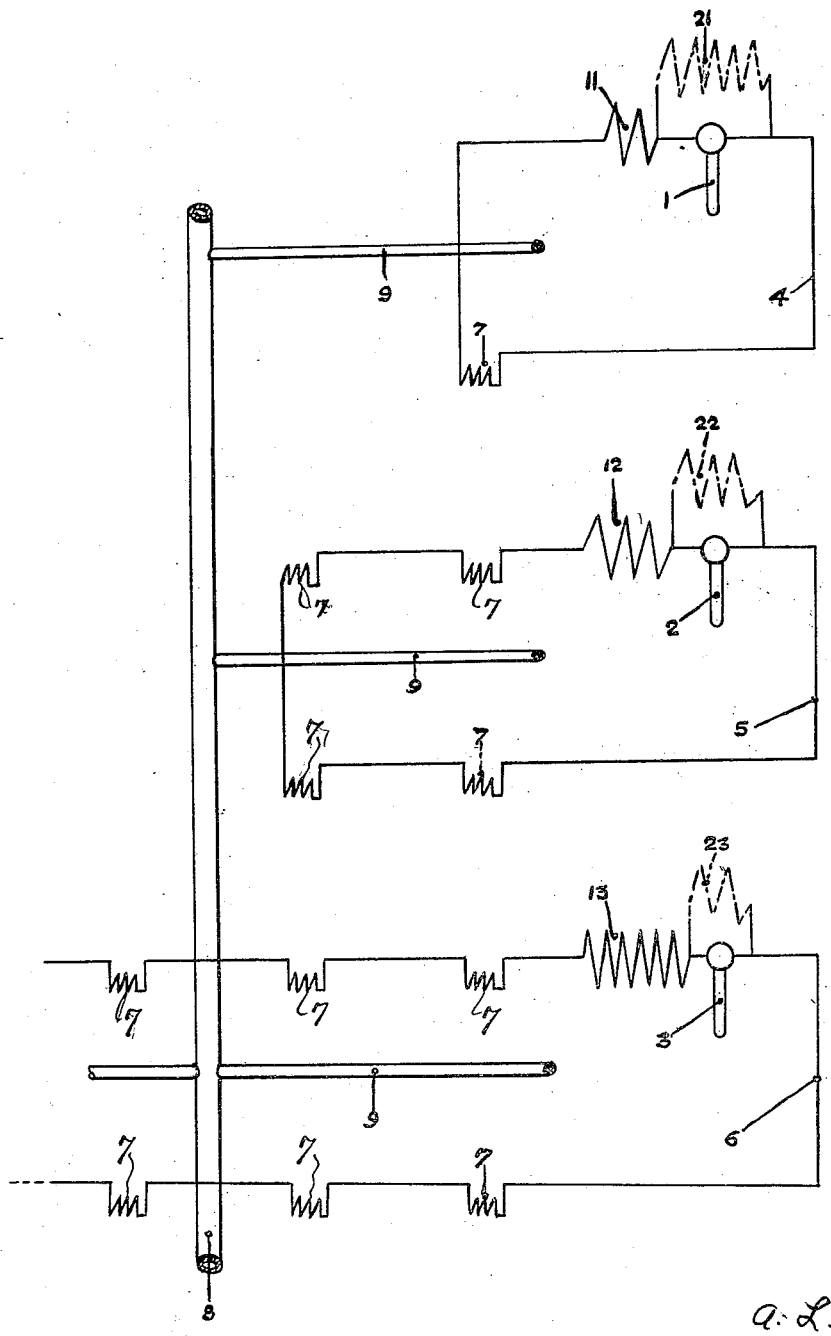
Inventor
A. L. Lange
By: Marks & Clark
Attys.

Patented Apr. 11, 1933

1,903,717

UNITED STATES PATENT OFFICE

AAGE LANGKILDE LANGE, OF COPENHAGEN, DENMARK

HEAT CONSUMPTION METER

Application filed August 12, 1925, Serial No. 49,857, and in Denmark August 21, 1924.

The present invention relates to the measurement of heat consumption in houses and apartments which are supplied with heat, such as steam, hot water or hot air, from a central heating plant or source of supply.

It has been the practice in plants of this kind to install meters for indicating the quantity of heat furnished each consumer by providing a suitable electric or mechanical meter connected to the radiators or registers. In some types of electrical installations it has been found that thermo-electrical elements may be employed, these elements generating a current proportional to the total heat consumption at the several locations to which the heat is supplied.

In the present invention it is an object to provide an electric circuit in which the current is influenced by thermo-electric elements and in which resistances conforming with the size of the apartment or the number of heat exchange units are inserted for the purpose of maintaining a predetermined ratio between the current in the meter and that generated in the circuit proper.

It is also an object of the invention to provide meters which are designed to furnish a comparison between the several points of heat consumption.

It is recognized that the occupants of apartments in the same building desire different degrees of room temperature and ventilation. Some occupants maintain a high temperature in their apartments while others desire a lower temperature, and the degree of ventilation, which obviously results in heat losses, also varies. For this reason it is sometimes desirable to provide meters which furnish a comparison of the degree of heat consumption by each use.

According to the present invention the meter of an occupant desiring high room temperature and a relatively large amount of ventilation indicates a higher degree of relative heat consumption than that of a consumer whose room temperature is low and whose apartment is less ventilated, even though the latter consumer occupies a relatively larger apartment and employs a greater number of heat exchange units, such as radiators or registers. For this purpose each installation is provided with an electric circuit in which is interposed a meter, a thermosensitive element and a resistance, the purposes of which will be explained more fully hereinafter.

Referring to the drawing, which illustrates a diagrammatic arrangement of the system, it will be seen that a steam or hot water main 8 supplies several apartments with heat through the branch pipes 9 forming heat installation units. Each apartment is supplied with a suitable radiator or radiators, depending, of course, on the size of the apartment. The electric circuits 4, 5 and 6, referred to above may receive current from thermo-piles or from some other source of current which is in series with thermo-sensitive resistances. The element 7 for each apartment is in the drawing intended to represent a heat responsive device, either a thermo-pile generator or a thermo-sensitive resistance. The meters 1, 2 and 3 are electrolytic meters, and contain a metal, such as mercury.

As shown in the drawing the circuit 6 represents a relatively large branch installation, circuits 4 and 5 being connected with smaller installations. It is obvious that if there are six radiators to each of which is connected a thermo-pile the total current generated in circuit 6 will be six times greater than that generated in circuit 4 in which a single thermo-pile is employed, assuming each of these installations consumes the same relative amount of heat. In order to obtain a similar reading in each of the meters when the proportional amount of heat used is the same in each installation, each circuit is provided with a resistance as indicated at 11, 12 and 13. These resistances are proportional to the size of the apartment or the number of thermo-responsive elements 7 employed in the circuit and represent a constant by which the reading of the meter is multiplied to obtain the total heat consumption of each apartment.

If in the illustration described above the three consumers use their installations in the same degree, that is, consume the supply of heat in proportion to the size of their apartments, the readings on the meters will be identical. If, on the other hand, one of the occupants consumes a relatively greater amount of heat with respect to the size of his apartment, his meter will indicate a greater amount of heat per cubic foot of space in the apartment. In this manner it is possible for the several occupants to determine the relative amounts of heat consumed by each of the users.

While the resistances inserted in the circuit may be in series in the circuit it is possible to obtain similar results by shunting the resistances around the meters as shown at 21, 22 and 23. If desired, both resistances may be employed, the ultimate result being the reduction of the amount of micro-amperage in the current flowing through the meter. The ratio of this amount and that generated by the thermo-piles is inversely proportional to the number of thermo-sensitive devices in the circuit.

As the meter and the heat responsive devices 7 of each apartment are in series the strength of the current is of course the same in either. But if the special resistances 11, 12 or 21, 22 were not provided for, the strength of the current generated by the heat responsive devices 7, would then not be the same, and the different meters 1, 2 would not give comparable results in the sense of the invention.

If a previous correction of the meters is necessary, as for instance in mercury meters, on account of different calibers of the depositing tubes or different resistances of the electrolytic chambers, this correction may then be imparted to the resistances 11, 12 and 13 or the shunts 21, 22, 23 or the said constants, the latter serving as the only necessary factor for calculating the real heat consumption from the measured one. The constants as a rule ought to be whole numbers.

I claim:

1. In a central heating system, a heat installation unit, an electric heat measuring device for said unit, a thermo-electric element in circuit with said measuring device, said element being responsive to differences in temperature between said unit and the surrounding air for generating the current passing through said measuring device, and a resistance element interposed in said circuit, the resistance of said resistance element being proportional to the volume of space to be heated by said unit.

2. In a central heating system as described in claim 1, said thermo-electric element comprising spaced thermo-sensitive members in numbers corresponding to the size of the space to be heated for generating the current passing through said heat measuring device.

In testimony whereof I hereunto affix my signature.

AAGE LANGKILDE LANGE.